(12) United States Patent
Morris et al.

(10) Patent No.: US 10,914,278 B2
(45) Date of Patent: Feb. 9, 2021

(54) END CAP FOR FILTER ELEMENT

(71) Applicant: CATERPILLAR INC., Peoria, IL (US)

(72) Inventors: Bryant A. Morris, Peoria, IL (US); Jeffrey R. Ries, Metamora, IL (US); Brian J. Sutton, Edwards, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 16/827,108

(22) Filed: Mar. 23, 2020

(65) Prior Publication Data

US 2020/0222834 A1 Jul. 16, 2020

Related U.S. Application Data

(62) Division of application No. 14/861,060, filed on Sep. 22, 2015, now abandoned.

(51) Int. Cl.
| | |
|---|---|
| *B01D 35/00* | (2006.01) |
| *B01D 36/00* | (2006.01) |
| *F02M 37/22* | (2019.01) |
| *F02M 37/42* | (2019.01) |
| *B01D 29/11* | (2006.01) |

(Continued)

(52) U.S. Cl.
CPC .......... *F02M 37/42* (2019.01); *B01D 29/114* (2013.01); *B01D 29/58* (2013.01); *B01D 35/005* (2013.01); *B01D 35/30* (2013.01); *B01D 36/003* (2013.01); *F02M 37/22* (2013.01); *B01D 2201/291* (2013.01); *B01D 2201/295* (2013.01);

(Continued)

(58) Field of Classification Search
CPC ...... B01D 35/30; B01D 29/58; B01D 29/114; B01D 35/005; B01D 36/003; B01D 2201/291; B01D 2201/295; B01D 2265/022; F02M 37/221; F02M 37/42; F02M 37/22; F02M 37/24; F02M 37/34
See application file for complete search history.

(56) References Cited

U.S. PATENT DOCUMENTS

| 3,312,351 A | 4/1967 | Kasten |
| 3,390,778 A | 7/1968 | Uhen |

(Continued)

FOREIGN PATENT DOCUMENTS

| DE | 10 2005 005848 | 8/2006 |
| DE | 10 2006 051 406 A1 | 4/2008 |

(Continued)

*Primary Examiner* — Angel Olivera
(74) *Attorney, Agent, or Firm* — Finnegan, Henderson, Farabow, Garrett & Dunner, LLP

(57) ABSTRACT

An end cap for a filter element may include an element receiver configured to be coupled to a tubular member, and a base passage receiver in flow communication with the element receiver. The end cap may further include an end cap barrier extending outward from the base passage receiver, the end cap barrier including a first side configured to face a filter base. The end cap may also include end cap flow passages configured to provide flow communication between filter media and a filter base, and including a passage opening spaced a first distance from the first side. The end cap may further include a barrier edge and a peripheral seal, wherein an uppermost surface of the peripheral seal terminates a second distance from the first side of the end cap barrier, wherein the first distance is greater than the second distance.

5 Claims, 10 Drawing Sheets

(51) Int. Cl.
  *B01D 29/58* (2006.01)
  *B01D 35/30* (2006.01)
  *F02M 37/24* (2019.01)
  *F02M 37/34* (2019.01)

(52) U.S. Cl.
  CPC ....... *B01D 2265/022* (2013.01); *F02M 37/24* (2019.01); *F02M 37/34* (2019.01)

(56) References Cited

U.S. PATENT DOCUMENTS

| | | |
|---|---|---|
| 3,465,883 A | 9/1969 | Jumper |
| 4,948,505 A * | 8/1990 | Petrucci ................ B01D 35/30 210/238 |
| 5,084,170 A | 1/1992 | Janik et al. |
| 5,591,332 A | 1/1997 | Reid |
| 7,938,963 B2 | 5/2011 | Klein et al. |
| 8,535,520 B2 | 9/2013 | Reyinger et al. |
| 2009/0057213 A1 | 3/2009 | Schiavon |
| 2012/0080372 A1 | 4/2012 | Ries |

FOREIGN PATENT DOCUMENTS

| | | |
|---|---|---|
| DE | 10 2007 048 550 A1 | 4/2008 |
| GB | 1604832 | 12/1981 |
| WO | WO 2005/063358 | 7/2005 |
| WO | WO 2009/095339 A1 | 8/2009 |

* cited by examiner

END CAP FOR FILTER ELEMENT

This application is a Divisional of U.S. patent application Ser. No. 14/861,060 filed Sep. 22, 2015. The contents of the above-referenced application is expressly incorporated herein by reference in its entirety.

TECHNICAL FIELD

The present disclosure relates to an end cap, and more particularly, to an end cap for a filter element.

BACKGROUND

Engines, including compression-ignition engines, spark-ignition engines, gasoline engines, gaseous fuel-powered engines, and other internal combustion engines, may operate more effectively with fuel from which contaminates have been removed prior to the fuel reaching a combustion chamber of the engine. In particular, fuel contaminates, if not removed, may lead to undesirable operation of the engine and/or may increase the wear rate of engine components, such as, for example, fuel system components.

Effective removal of contaminates from the fuel system of a compression-ignition engine may be particularly important. In some compression-ignition engines, air is compressed in a combustion chamber, thereby increasing the temperature and pressure of the air, such that when fuel is supplied to the combustion chamber, the fuel and air mixture ignite. If water and/or other contaminates, such as particulates, are not removed from the fuel, the contaminates may interfere with and/or damage, for example, fuel injectors, which may have orifices manufactured to exacting tolerances and shapes for improving the efficiency of combustion and/or reducing undesirable exhaust emissions. Moreover, the presence of water in the fuel system may cause considerable engine damage and/or corrosion in the injection system.

Fuel filtration systems serve to remove contaminates from the fuel. For example, some conventional fuel systems may include a fuel filter, which removes water and large particulate matter, and another fuel filter, which removes a significant portion of remaining particulate matter (e.g., smaller contaminates), such as fine particulate matter. However, water may be particularly difficult to separate from fuel under certain circumstances. For example, if water is emulsified in the fuel it may be relatively more difficult to separate from fuel. In addition, for some types of fuel, such as, for example, fuel having a bio-component, it may be relatively more difficult to separate the water from the fuel. Therefore, it may be desirable to provide a filter element and/or filter assembly with an improved ability to separate water from fuel.

In addition, when contaminates accumulate in a filter assembly, in order to refresh the effectiveness of the filter assembly, it may be desirable to remove the contaminates from the filter element or replace the filter element of the filter assembly. Removal of the filter element from the filter assembly may result in a void in the fluid system being filtered. As a result, it may be desirable to prime the refreshed filter assembly following assembly of the cleaned filter element or new filter element into the filter assembly by adding some of the fluid from the fluid system to the refreshed filter assembly. However, if unfiltered fluid is taken from the fluid system and added to the filter assembly, the unfiltered fluid must be added to the filter assembly in such a way that the added fluid is filtered by the filter assembly before returning to the fluid system. Thus, it may be desirable to provide a filter element that insures that the fluid added for priming the filter assembly is filtered before it is pumped back into the fluid system.

An attempt to provide desired filtration is described in U.S. Pat. No. 5,084,170 ("the '170 patent") to Janik et al., issued Jan. 28, 1992. Specifically, the '170 patent discloses a fuel filter assembly having a base that mounts a disposable filter element cartridge. The cartridge includes a dual stage filter system, wherein fuel flows axially to a primary filter element for removing particulate matter and coalescing water droplets, and axially to a secondary filter stage that functions as a water barrier. The filtered fuel flows axially and exits through an outlet passage in the base. Water may be collected in a sump.

Although the fuel filter of the '170 patent purports to separate water from fuel, it may not provide sufficient separation under circumstances where the fuel is emulsified or includes bio-components. Thus, it may not provide a desirable level of fuel filtration. In addition, the fuel filter of the '170 patent does not address possible drawbacks associated with priming the filter element cartridge when servicing or replacing the cartridge.

The end cap, filter element, and filter assembly disclosed herein may be directed to mitigating or overcoming one or more of the possible drawbacks set forth above.

SUMMARY

According to a first aspect, a filter element having a longitudinal axis may include a first end cap including an end cap barrier. The end cap barrier may include an inner end cap aperture configured to provide flow communication between the interior of the filter element and the exterior of the filter element, end cap flow passages configured to provide flow communication between the interior of the filter element and the exterior the of the filter element. The filter element may also include a first tubular member having a first end coupled to the first end cap to provide flow communication between the inner end cap aperture and a second end of the first tubular member. The first tubular member may include an inner tubular element including a tubular element first end and extending along the longitudinal axis to a tubular element second end. The tubular element first end may be coupled to the first end cap and may be configured to provide flow communication between the inner end cap aperture and the tubular element second end. The first tubular member may also include an outer tubular element coupled to the tubular element second end and extending coextensively along the inner tubular element to form a space between the inner tubular element and the outer tubular element. The outer tubular element may include first tubular element apertures. The filter element may further include first filter media extending around the outer tubular element, an intermediate barrier coupled to the second end of the first tubular member and including an intermediate barrier aperture, and second filter media having different filtering characteristics than filtering characteristics of the first filter media. The second filter media may include an inner passage, may be coupled to the intermediate barrier opposite the first filter media, and may be in flow communication with the inner tubular element. The filter element may also include a second end cap coupled to the second filter media at an end opposite the intermediate barrier. One of the first filter media and the second filter media may include a coalescing-type media configured to promote separation of a first fluid from a second fluid having different characteristics than the first fluid as a fluid including the first fluid and the second fluid passes through the one of the first filter media and the second filter media.

According to a further aspect, a filter element having a longitudinal axis may include a first end cap including an end cap barrier. The end cap barrier may include an inner end cap aperture configured to provide flow communication between the interior of the filter element and the exterior of the filter element, and end cap flow passages configured to provide flow communication between the interior of the filter element and the exterior of the filter element. The filter element may further include a first tubular member having a first end coupled to the first end cap to provide flow communication between the inner end cap aperture and a second end of the first tubular member. The first tubular member may include an inner tubular element including a tubular element first end and extending along the longitudinal axis to a tubular element second end. The tubular element first end may be coupled to the first end cap and may be configured to provide flow communication between the inner end cap aperture and the tubular element second end. The first tubular member may also include an outer tubular element coupled to the tubular element second end and extending coextensively along the inner tubular element to form a space between the inner tubular element and the outer tubular element. The outer tubular element may include first tubular element apertures. The filter element may further include first filter media extending around the outer tubular element, and an intermediate barrier coupled to the second end of the first tubular member and including an intermediate barrier aperture. The filter element may also include second filter media having different filtering characteristics than filtering characteristics of the first filter media. The second filter media may include an inner passage, may be coupled to the intermediate barrier opposite the first filter media, and may be in flow communication with the inner tubular element. The filter element may further include a second end cap coupled to the second filter media at an end opposite the intermediate barrier. One of the first filter media and the second filter media may include a coalescing-type media configured to promote separation of a first fluid from a second fluid having different characteristics than the first fluid as a fluid including the first fluid and the second fluid passes through the one of the first filter media and the second filter media. The first fluid may be water, and the second fluid may be fuel.

According to another aspect, a filter assembly may include a filter canister and a filter element received in the filter canister. The filter element may have a longitudinal axis and may include a first end cap including an end cap barrier. The end cap barrier may include an inner end cap aperture configured to provide flow communication between the interior of the filter element and the exterior of the filter element, and end cap flow passages configured to provide flow communication between the interior of the filter element and the exterior of the filter element. The filter element may also include a first tubular member having a first end coupled to the first end cap to provide flow communication between the inner end cap aperture and a second end of the first tubular member. The first tubular member may include an inner tubular element including a tubular element first end and extending along the longitudinal axis to a tubular element second end. The tubular element first end may be coupled to the first end cap and may be configured to provide flow communication between the inner end cap aperture and the tubular element second end. The first tubular member may also include an outer tubular element coupled to the tubular element second end and extending coextensively along the inner tubular element to form a space between the inner tubular element and the outer tubular element. The outer tubular element may include first tubular element apertures. The filter element may further include first filter media extending around the outer tubular element, and an intermediate barrier coupled to the second end of the first tubular member and including an intermediate barrier aperture. The filter element may also include second filter media having different filtering characteristics than filtering characteristics of the first filter media. The second filter media may include an inner passage, may be coupled to the intermediate barrier opposite the first filter media, and may be in flow communication with the inner tubular element. The filter element may further include a second end cap coupled to the second filter media at an end opposite the intermediate barrier. One of the first filter media and the second filter media may include a coalescing-type media configured to promote separation of a first fluid from a second fluid having different characteristics than the first fluid as a fluid including the first fluid and the second fluid passes through the one of the first filter media and the second filter media.

According to a further aspect, an end cap for a filter element may include an element receiver having a longitudinal axis and being configured to be coupled to a tubular member. The end cap may also include a base passage receiver, with the element receiver and the base passage receiver being in flow communication with one another. The end cap may further include an end cap barrier extending outward from the base passage receiver in a direction transverse to the longitudinal axis, with the end cap barrier including a first side configured to face a filter base and a second side configured to face filter media. The end cap may also include end cap flow passages around the base passage receiver and configured to provide flow communication between filter media and a filter base, with the end cap flow passages extending from the second side of the end cap barrier to the first side of the end cap barrier in a direction along the longitudinal axis. The end cap flow passages may each include a passage opening spaced a first distance from the first side of the end cap barrier. The end cap may further include a barrier edge associated with the end cap barrier and a peripheral seal coupled to the barrier edge and configured to provide a fluid seal with at least one of a filter base and a canister of a filter assembly. An uppermost surface of the peripheral seal may terminate a second distance from the first side of the end cap barrier, wherein the first distance is greater than the second distance.

According to another aspect, an end cap for a filter element may include an element receiver having a longitudinal axis and being configured to be coupled to a tubular member. The end cap may also include a base passage receiver, with the element receiver and the base passage receiver being in flow communication with one another. The end cap may further include an end cap barrier extending outward from the base passage receiver in a direction transverse to the longitudinal axis, with the end cap barrier including a first side configured to face a filter base and a second side configured to face filter media. The end cap may also include end cap flow passages around the base passage receiver and configured to provide flow communication between filter media and a filter base, with the end cap flow passages extending from the second side of the end cap barrier to the first side of the end cap barrier in a direction along the longitudinal axis. The end cap flow passages may each include a passage opening spaced a first distance from the first side of the end cap barrier, and base passage receiver may terminate at a second distance from the first side of the end cap barrier, wherein the first distance is greater than the second distance.

According to a further aspect, an end cap for a filter element may include an element receiver having a longitudinal axis and being configured to be coupled to a tubular member. The end cap may also include a base passage receiver, with the element receiver and the base passage receiver being in flow communication with one another. The end cap may further include an end cap barrier extending outward from the base passage receiver in a direction transverse to the longitudinal axis, with the end cap barrier including a first side configured to face a filter base and a second side configured to face filter media. The end cap may also include end cap flow passages around the base passage receiver and configured to provide flow communication between filter media and a filter base, with the end cap flow passages extending from the second side of the end cap barrier to the first side of the end cap barrier in a direction along the longitudinal axis. Each of the end cap flow passages may be defined by a tubular passage conduit extending from the first side of the end cap barrier, and the passage openings may face outward and transverse relative to the longitudinal axis.

DETAILED DESCRIPTION

FIGS. 1-9 illustrate exemplary embodiments of a filter assembly 10. Filter assembly 10 may be used to filter fluids such as, for example, fuel, lubricants, coolants, and hydraulic fluid used by machines. According to some embodiments, filter assembly 10 may be used as a fuel/water separator filter, as explained in more detail below, and/or as an air filter. Other uses may be contemplated.

Figure 1:
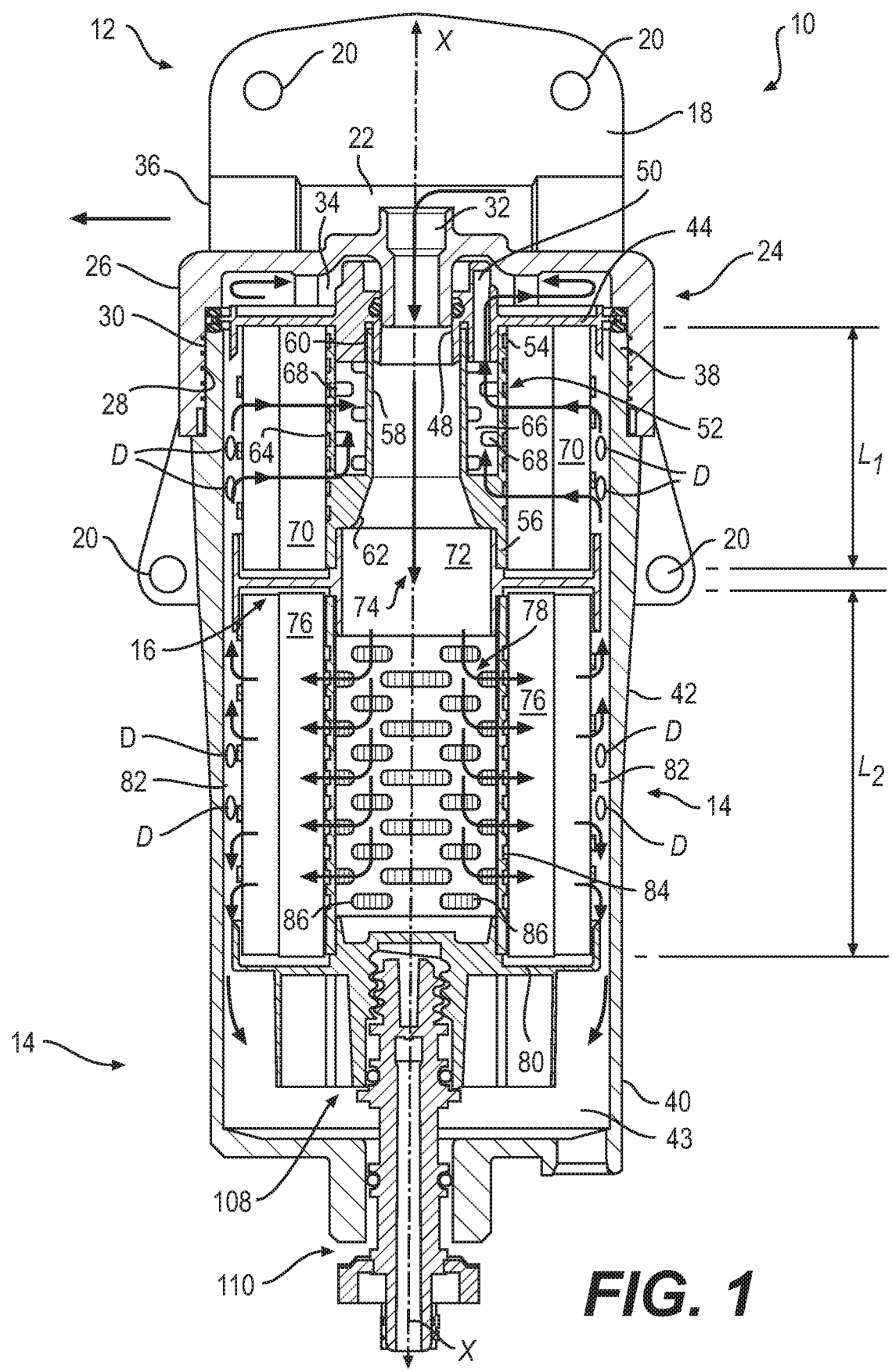
FIG. 1 is a side section view of an exemplary embodiment of a filter assembly.
Figure 2:
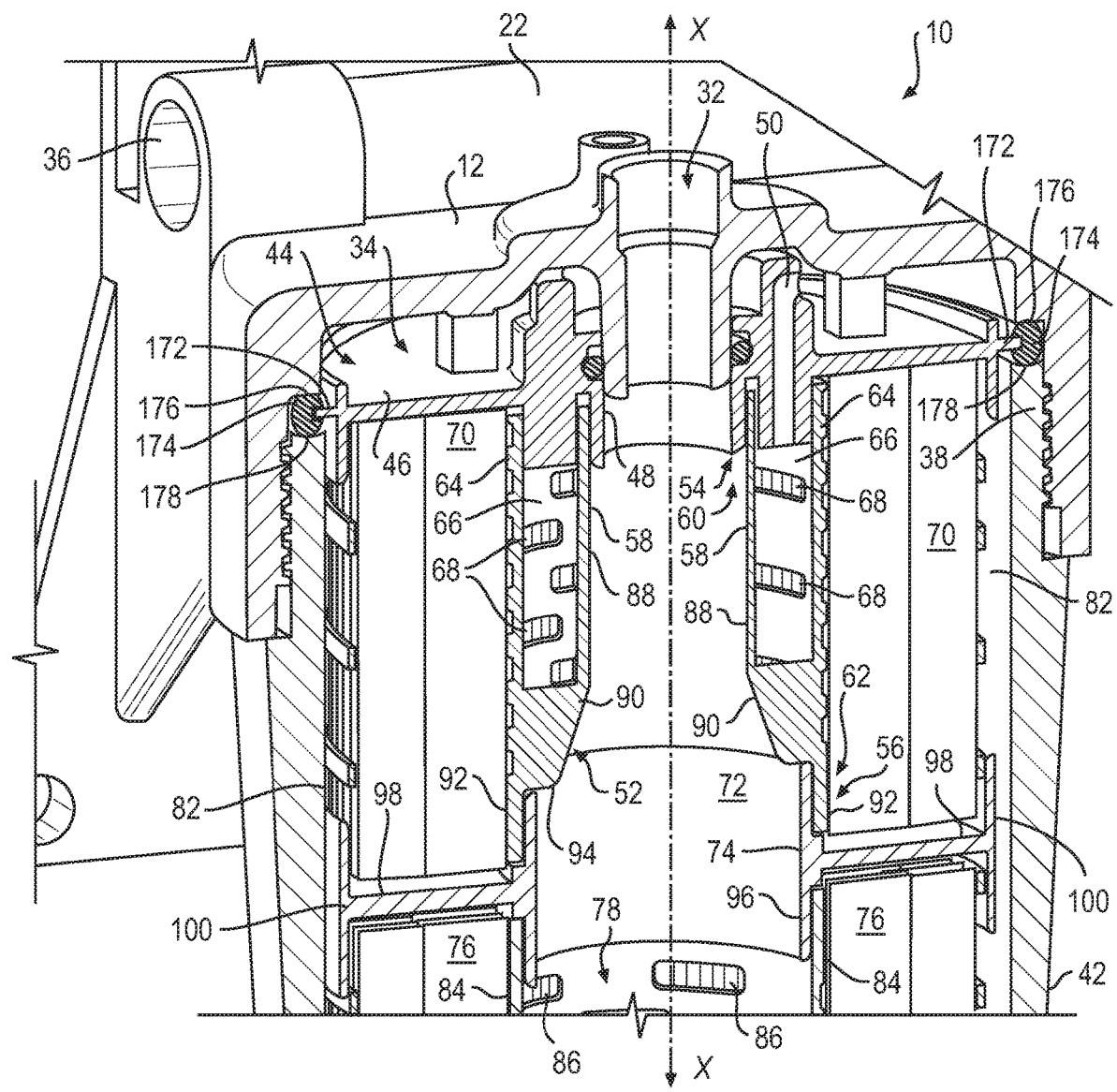
FIG. 2 is a partial perspective section view of an exemplary embodiment of a filter assembly.

Exemplary filter assembly 10 shown in FIGS. 1 and 2 includes a filter base 12 configured to couple filter assembly 10 to a machine, a canister 14 configured to be coupled to filter base 12, and a filter element 16 configured to be received in canister 14. According to some embodiments, for example, the embodiment shown in FIGS. 1 and 2, canister 14 and filter element 16 may be formed as a single part, such that canister 14 is part of filter element 16. Such embodiments may be configured such that filter element 16 including canister 14 is coupled to filter base 12 in a "spin-on" fashion. According to some embodiments, canister 14 and filter element 16 are separate parts, with filter element 16 being configured to be received in a separate canister 14 and removed from canister 14 during servicing or replacement.

Exemplary filter base 12 includes a mounting bracket 18 having at least one hole 20 (e.g., four holes 20) for receiving a fastener for coupling filter base 12 to a machine. Other coupling configurations are contemplated. Exemplary filter base 12 also includes an extension 22 and a canister receiver 24 configured to be coupled to canister 14 and provide a fluid seal between filter base 12, canister 14, and/or filter element 16, for example, as shown in FIG. 2. Extension 22 serves to space canister receiver 24 from mounting bracket 18 to provide clearance for canister 14. For example, canister receiver 24 may include an annular flange 26 including internal threads 28 configured to engage with complimentary external threads 30 of canister 14.

As shown in FIGS. 1 and 2, exemplary filter base 12 includes a first passage 32, a manifold 34, and a second passage 36. Exemplary first passage 32 is configured to be coupled to a fluid conduit of a fluid system, such as, for example, a fuel system, a lubrication system, a hydraulic system, or a coolant system, such that it is in flow communication with filter assembly 10. Exemplary manifold 34 is configured to receive a portion of filter element 16 and provide flow communication between filter assembly 10 and second passage 36, as explained in more detail herein.

Figure 3:
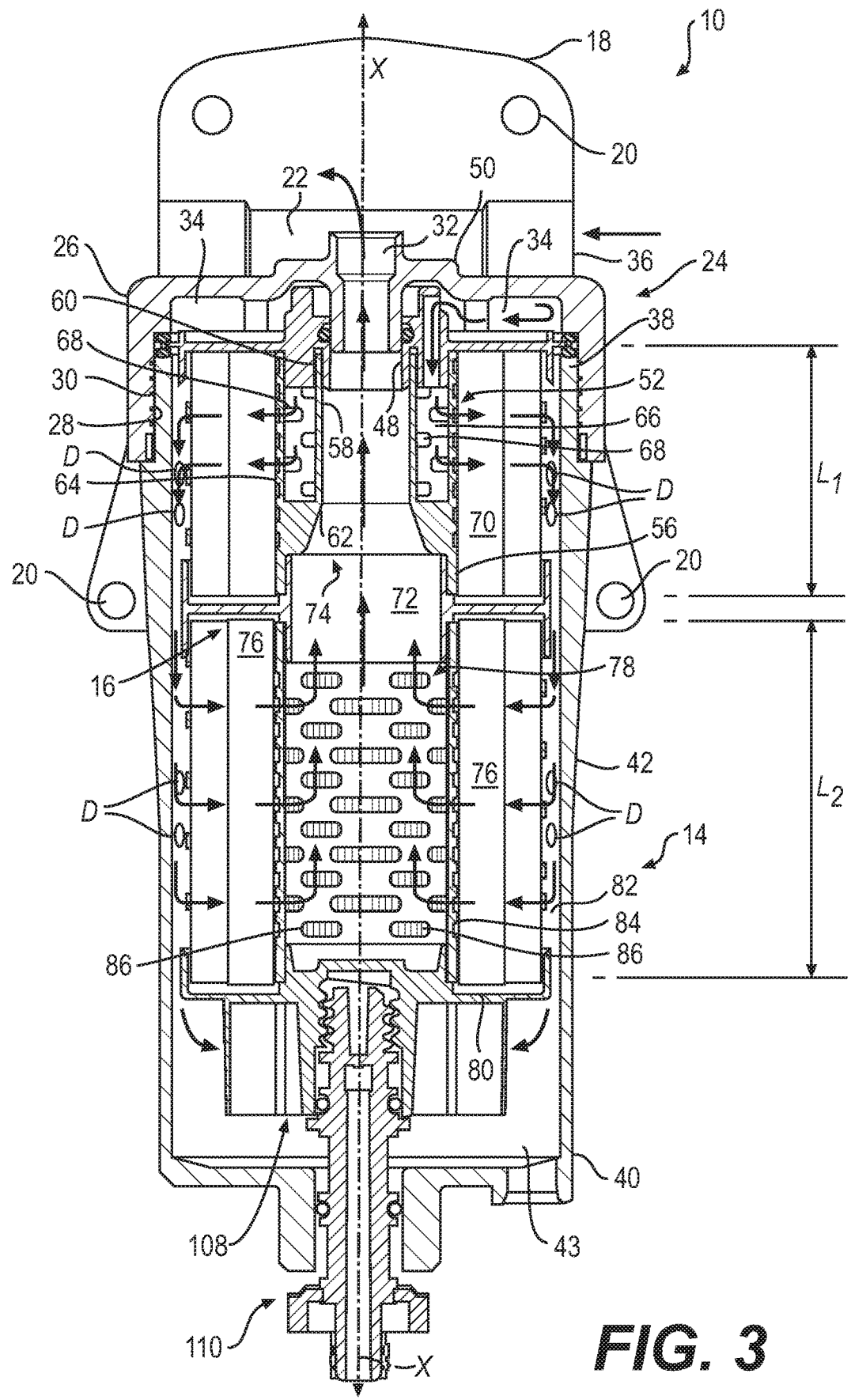
FIG. 3 is a side section view of an exemplary embodiment of a filter assembly.

According to some embodiments, for example, as shown in FIG. 1, exemplary first passage 32 is configured to be coupled to a fluid conduit of a fluid system, such that fluid flows into filter assembly 10 via first passage 32. In such embodiments, exemplary manifold 34 is configured to receive fluid that has passed through filter assembly 10 and provide flow communication to second passage 36, which is configured to return filtered fluid to the fluid system following filtration, including removal of particulates and/or fluids, such as water, from the fuel. According to some embodiments, for example, as shown in FIG. 3, exemplary second passage 36 is configured to be coupled to a fluid conduit of a fluid system, such that fluid flows into filter assembly 10 via second passage 36 and exemplary manifold 34. In such embodiments, exemplary first passage 32 is configured to receive fluid that has passed through filter assembly 10 and return filtered fluid to the fluid system following filtration, including removal of particulates and/or fluids, such as water, from the fuel.

Filter assembly 10 shown in FIGS. 1 and 2 includes a longitudinal axis X, and exemplary canister 14 includes a first end 38, an oppositely-disposed second end 40, and a body portion 42 extending therebetween. As shown in FIG. 1, first end 38 is an open end, and second end 40 is a closed end. Exemplary second end 40 forms a collection bowl 43 (e.g., a water collection bowl). According to some embodiments, collection bowl 43 may be formed as part of canister 14 as shown, or may be formed as a separate part that may be selectively coupled to and un-coupled from second end 40 of canister 14.

Exemplary canister 14 may define a cross-section that is substantially circular, substantially oval-shaped, and/or substantially polygonal. In non-circular-shaped embodiments, first end 38 of canister 14 may be circular, so that threads of first end 38 may engage with threads 28 of annular flange 26 of filter base 12. According to some embodiments, the cross-sections may be substantially constant along the longitudinal length of canister 14. According to some embodiments, the cross-section may vary along the longitudinal length of canister 14. The cross-section may be chosen based on various considerations, such as, for example, the size and shape of the available space at a location of a machine that receives filter assembly 10.

Exemplary filter element 16 includes a longitudinal axis substantially parallel to (e.g., co-linear with respect to) longitudinal axis X of filter assembly 10. As shown in FIG. 1, exemplary filter element includes a first end cap 44 including an end cap barrier 46. Exemplary first end cap 44 further includes an inner end cap aperture 48 configured to provide flow communication between the interior of filter element 16 and the exterior of filter element 16. First end cap 44 also includes end cap flow passages 50 configured to provide flow communication between the interior of filter element 16 and the exterior of filter element 16. Exemplary filter element 16 also includes a first tubular member 52 having a first end 54 coupled to first end cap 44 to provide flow communication between inner end cap aperture 48 and a second end 56 of first tubular member 52. Exemplary first tubular member 52 includes an inner tubular element 58 including a tubular element first end 60 and extending along the longitudinal axis of filter element 16 to a tubular element second end 62. In the exemplary embodiment shown in FIGS. 1 and 2, tubular element first end 60 is coupled to first end cap 44 and is configured to provide flow communication between inner end cap aperture 48 and tubular element second end 62. First tubular member 52 also includes an outer tubular element 64 coupled to tubular element second end 62 and extending coextensively along inner tubular element 58 to form a space 66 between inner tubular element 58 and outer tubular element 64. In the exemplary embodiment shown, outer tubular element 64 includes first tubular element apertures 68.

Exemplary filter element 16 also includes first filter media 70 extending around outer tubular element 64, and an intermediate barrier 72 coupled to second end 56 of first tubular member 52 and including an intermediate barrier aperture 74. Exemplary filter element 16 also includes second filter media 76 having different filtering characteristics than filtering characteristics of first filter media 70. Exemplary second filter media 76 includes an inner passage 78 and is coupled to intermediate barrier 72 opposite first filter media 70 and is in flow communication with inner tubular element 58. Exemplary filter element 16 also includes a second end cap 80 coupled to second filter media 76 at an end opposite intermediate barrier 72.

According to some embodiments, one of first filter media 70 and second filter media 76 includes a coalescing-type media configured to promote separation of a first fluid from a second fluid having different characteristics than the first fluid as a fluid including the first fluid and the second fluid passes through the one of first filter media 70 and second filter media 76. According to some embodiments, the fluid to be filtered includes water and fuel, wherein the first fluid is water and the second fluid is fuel. The fuel may be diesel fuel or any fuel known to those skilled in the art. Other combinations of first and second fluids are contemplated.

In the exemplary embodiments shown, either first filter media 70 or second filter media 76 may be a coalescing-type media configured to promote separation of a first fluid from a second fluid having different characteristics than the first fluid, such that one of the first fluid and the second fluid coalesces into droplets as it passes through the coalescing-type media, and such that the droplets of the first fluid form on the downstream surface of the coalescing-type media. According to some embodiments, the other of first filter media 70 and second filter media 76 may be a barrier-type media configured to separate the first fluid from the second fluid before the fluid passes through the barrier-type media, such that droplets of the first fluid form on the upstream surface of the barrier-type media, and the second fluid passes through the barrier-type media. As explained below, according to some embodiments, first filter media 70 may be a coalescing-type media, and second filter media 76 may be a barrier-type media (e.g., as shown in FIG. 1), and alternatively, according to some embodiments, second filter media 76 may be a coalescing-type media, and first filter media 70 may be a barrier-type media (e.g., as shown in FIG. 3). Coalescing-type media and/or barrier-type media known to those skilled in the art are contemplated.

In the exemplary embodiment shown in FIG. 1, first filter media 70 includes a barrier-type media, and second filter media 76 includes a coalescing-type media. As identified by the arrows in FIG. 1, filter element 16 is configured such that fluid entering filter element 16 enters through first passage 32 of filter base 12 and flows into inner end cap aperture 48. Thereafter, fluid passes from tubular element first end 60 through inner tubular element 58 to tubular element second end 62 and through intermediate barrier aperture 74 into inner passage 78 of second filter media 76. Thereafter, fluid passes through second filter media 76 to the exterior of second filter media 76 and into canister space 82 between an inner surface of body portion 42 of canister 14 and an outer surface of second filter media 76. In this exemplary configuration, second filter media 76 includes a coalescing-type media that promotes separation of the first fluid from the second fluid as the fluid passes through second filter media 76, such that the first fluid coalesces and forms droplets D of the first fluid on the downstream surface of second filter media 76 (e.g., the outer surface or surface opposite inner passage 78 of second filter media 76). Thereafter, the droplets D of the first fluid in canister space 82, pulled by gravity, drop down into the bottom of canister 14 for collection in collection bowl 43. The remaining fluid, including the second fluid and any remaining first fluid following coalescing, flows in a direction opposite the direction of the droplets D via canister space 82 into first filter media 70. In the exemplary embodiment shown in FIG. 1, first filter media 70 is a barrier-type media that prevents the first fluid from entering first filter media 70, such that droplets D of the first fluid form on the upstream surface of first filter media 70 (e.g., the outer surface or surface opposite first tubular member 52). For example, according to some embodiments, the first fluid may be water, and the barrier-type media may include hydrophobic material that repels water. Thereafter, the droplets D of the first fluid in canister space 82, pulled by gravity, drop down into the bottom of canister 14 for collection in collection bowl 43.

Thereafter, the second fluid, separated from the first fluid, passes through first filter media 70, through tubular element apertures 68 into space 66 between inner tubular element 58 and outer tubular element 64, and through end cap flow passages 50 of first end cap 44. The remaining fluid, including the filtered second fluid, passes from end cap flow passages 50 through manifold 34 and out second passage 36 of filter base 12, and returns to the fluid system.

In the exemplary embodiment shown in FIG. 1, inner tubular element 58 and intermediate barrier 72 are configured to prevent fluid from passing through first filter media 70 without first passing through second filter media 76. In this exemplary configuration, the fluid to be filtered is forced to pass through both first filter media 70 and second filter media 76 before returning to the fluid system. In this exemplary configuration, contaminates such as particulates and water are filtered from the fluid.

In the exemplary embodiment shown in FIG. 3, in contrast to the exemplary embodiment shown in FIG. 1, first filter media 70 includes a coalescing-type media, and second filter media 76 includes a barrier-type media. As identified by the arrows in FIG. 3, filter element 16 is configured such that fluid entering filter element 16 enters through passage 36 and manifold 34 of filter base 12 and flows into end cap flow passages 50 into space 66 between inner tubular element 58 and outer tubular element 64. Thereafter, the fluid flows through tubular element apertures 68 into and through first filter media 70 to canister space 82 between the inner surface of body portion 42 of canister 14. In this exemplary configuration, first filter media 70, including a coalescing-type media, promotes separation of the first fluid from the second fluid as the fluid passes through first filter media 70, such that the first fluid coalesces and forms droplets D of the first fluid on the downstream surface of first filter media 70 (e.g., the outer surface or surface opposite first tubular member 52). Thereafter, the droplets D of the first fluid in canister space 82, pulled by gravity, drop down into the bottom of canister 14 for collection in collection bowl 43. The remaining fluid, including the second fluid and any remaining first fluid following coalescing, flows via canister space 82 into second filter media 76. In the exemplary embodiment shown in FIG. 3, second filter media 76 is a barrier-type media that prevents the first fluid from entering second filter media 76, such that droplets D of the first fluid form on the upstream surface of second filter media 76 (e.g., the outer surface or surface opposite inner passage 78). Thereafter, the droplets D of the first fluid in canister space 82, pulled by gravity, drop down into the bottom of canister 14 for collection in collection bowl 43. The remaining fluid that passes through second filter media 76 flows into inner passage 78 of second filter media 76, through intermediate barrier aperture 74 of intermediate barrier 72. Thereafter, the fluid passes through tubular element second end 62 into inner tubular element 58, through tubular element first end 60, through inner end cap aperture 48, and to the exterior of filter element 16. The remaining, filtered fluid passes through first passage 32 of filter base 12, and returns to the fluid system.

In the exemplary embodiment shown in FIG. 3, first end cap 44, intermediate barrier 72, and inner tubular element 58 are configured to prevent fluid passing through first filter media 70 from mixing with fluid passing through inner tubular element 58. In this exemplary configuration, the fluid to be filtered is forced to pass through both first filter media 70 and second filter media 76 before returning to the fluid system. In this exemplary configuration, contaminates such as particulates and water are filtered from the fluid.

As shown in FIG. 1, first filter media 70 has a first longitudinal length $L_1$ in a direction parallel to longitudinal axis X, and second filter media 76 has a second longitudinal length $L_2$ in a direction parallel to longitudinal axis X. According to some embodiments, first longitudinal length $L_1$ is the same as second longitudinal length $L_2$. According to some embodiments, first longitudinal length $L_1$ is different than second longitudinal length $L_2$. For example, a ratio of first longitudinal length $L_1$ to second longitudinal length $L_2$ ranges from 1:5 to 5:1, for example, from 1:4 to 4:1, from 1:3 to 3:1, from 1:2 to 2:1, or from 1.5:2 to 2:1.5. For example, the ratio of first longitudinal length $L_1$ to second longitudinal length $L_2$ ranges from 3:7 to 4:6, for example, when first filter media 70 includes a barrier-type media, and second filter media 76 includes a coalescing-type media. According to some embodiments, the ratio of first longitudinal length $L_1$ to second longitudinal length $L_2$ ranges from 7:3 to 6:4, for example, when first filter media 70 includes a coalescing-type media, and second filter media 76 includes a barrier-type media. The ratio may be tailored to provide a desired balance between filtration via a coalescing-type media and filtration via a barrier-type filter media.

According to some embodiments, filter element 16 may also include a second tubular member 84 in inner passage 78 of second filter media 76. Second tubular member 84 may be coupled to intermediate barrier 72 and second end cap 80. In the exemplary second tubular member 84 shown, second tubular member 84 includes second tubular member apertures 86 providing flow communication between inner passage 78 and second filter media 76.

Figure 4:
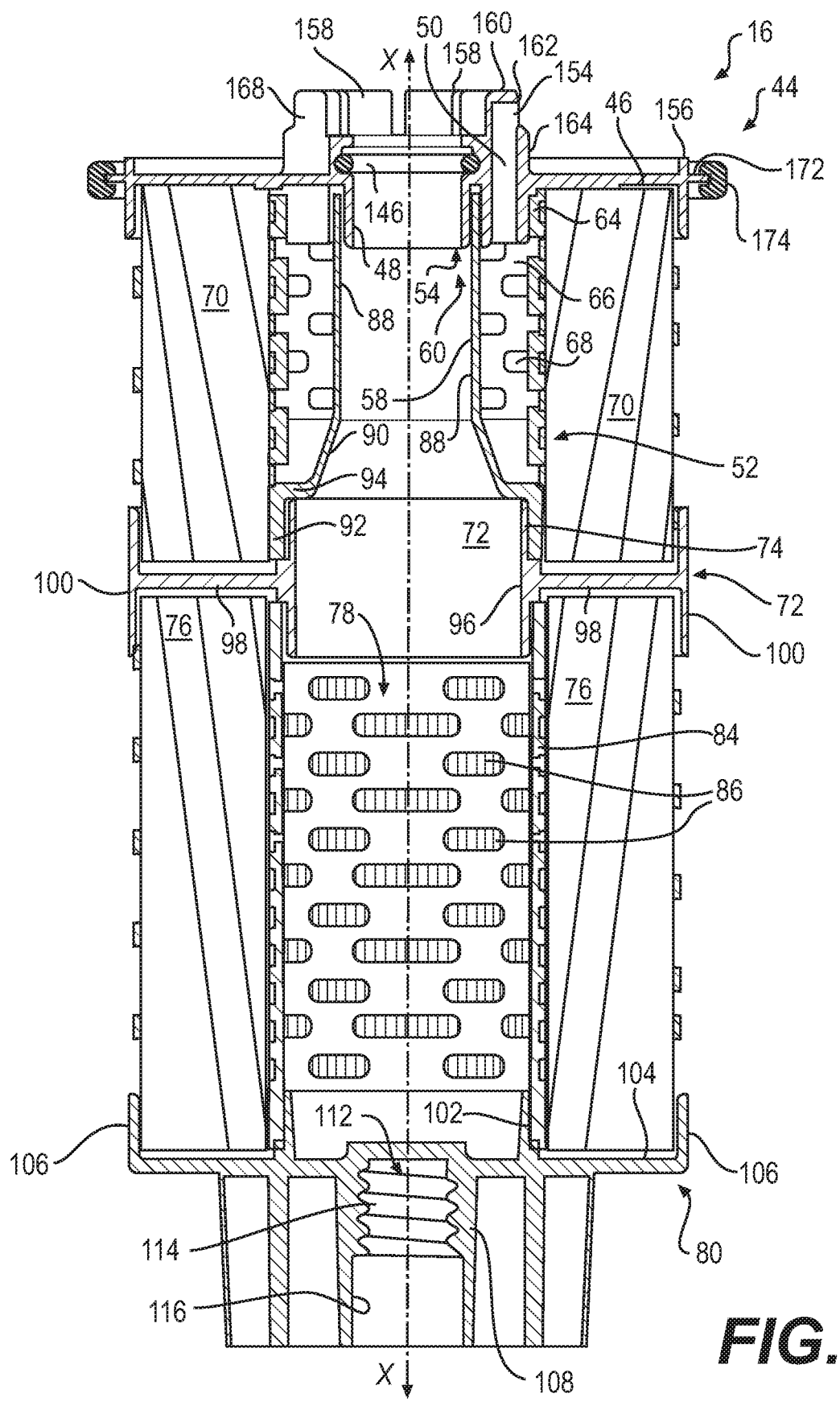
FIG. 4 is a side section view of an exemplary embodiment of a filter element.

As shown in FIG. 4, exemplary first tubular member 52 includes inner tubular element 58 coupled to outer tubular element 64 at tubular element second end 62. In the exemplary embodiment shown, inner tubular element 58 includes a first section 88 having a substantially uniform cross-section extending from tubular element first end 60 toward tubular element second end 62 and terminating at a second section 90 of inner tubular element 58, which extends to a third section 92 of inner tubular element 58. Second section 90 and third section 92 meet at a shoulder 94. Exemplary second section 90 is conical with a larger diameter adjacent third section 92. Exemplary third section 92 has a substantially uniform cross-section and extends to tubular element second end 62. In the exemplary embodiment shown, third section 92 is coupled to outer tubular element 64 and has substantially the same cross-sectional dimension as outer tubular element 64. According to some embodiments, such as shown, inner tubular element 58 and outer tubular element 64 have circular cross-sections, and thus, space 66 is annular. Other cross-sectional configurations are contemplated.

As shown in FIG. 4, exemplary intermediate barrier 72 includes intermediate barrier aperture 74, which is formed by intermediate tubular member 96. Intermediate tubular member 96 extends through intermediate barrier 72 and couples first tubular member 52 to second tubular member 84. For example, a first end of intermediate tubular member 96 extends into third section 92 of first tubular member 52 and abuts shoulder 94. A second end of intermediate tubular member 96 is received in a first end of second tubular member 84. Exemplary intermediate barrier 72 also includes a barrier portion 98 extending from an outer surface of intermediate tubular member 96 transverse (e.g., perpendicular) with respect to longitudinal axis X and terminating at a flange 100 extending in a direction substantially parallel to longitudinal axis X. Exemplary flange 100 extends from barrier portion 98 in both a first direction toward first end cap 44 and a second direction toward second end cap 80. In this exemplary configuration, first end cap 44 and intermediate barrier 72 combine to sandwich first filter media 70 around first tubular member 52, and intermediate barrier 72 and second end cap 80 sandwich second filter media 76 around second tubular member 84. Intermediate barrier 72, in part, prevents fluid from passing through filter element 16 without passing through both first filter media 70 and second filter media 76. According to some embodiments, such as shown, intermediate barrier 72, intermediate barrier aperture 74, intermediate tubular member 96, barrier portion 98, and flange 100 are circular or have circular cross-sections. Other shapes and cross-sectional configurations are contemplated.

In the exemplary embodiment shown in FIG. 4, second end cap 80 includes an end cap boss 102 extending from a second end cap barrier 104. End cap boss 102 is configured to receive a second end of second tubular member 84. Second end cap barrier 104 extends outward from end cap boss 102 and terminates at second end cap flange 106, which extends transverse (e.g., perpendicular) with respect to second end cap barrier 104 toward intermediate barrier 72. According to some embodiments, such as shown, end cap boss 102, second end cap barrier 104, and second end cap flange 106 are circular or have circular cross-sections. Other shapes and cross-sectional configurations are contemplated.

Figure 5:
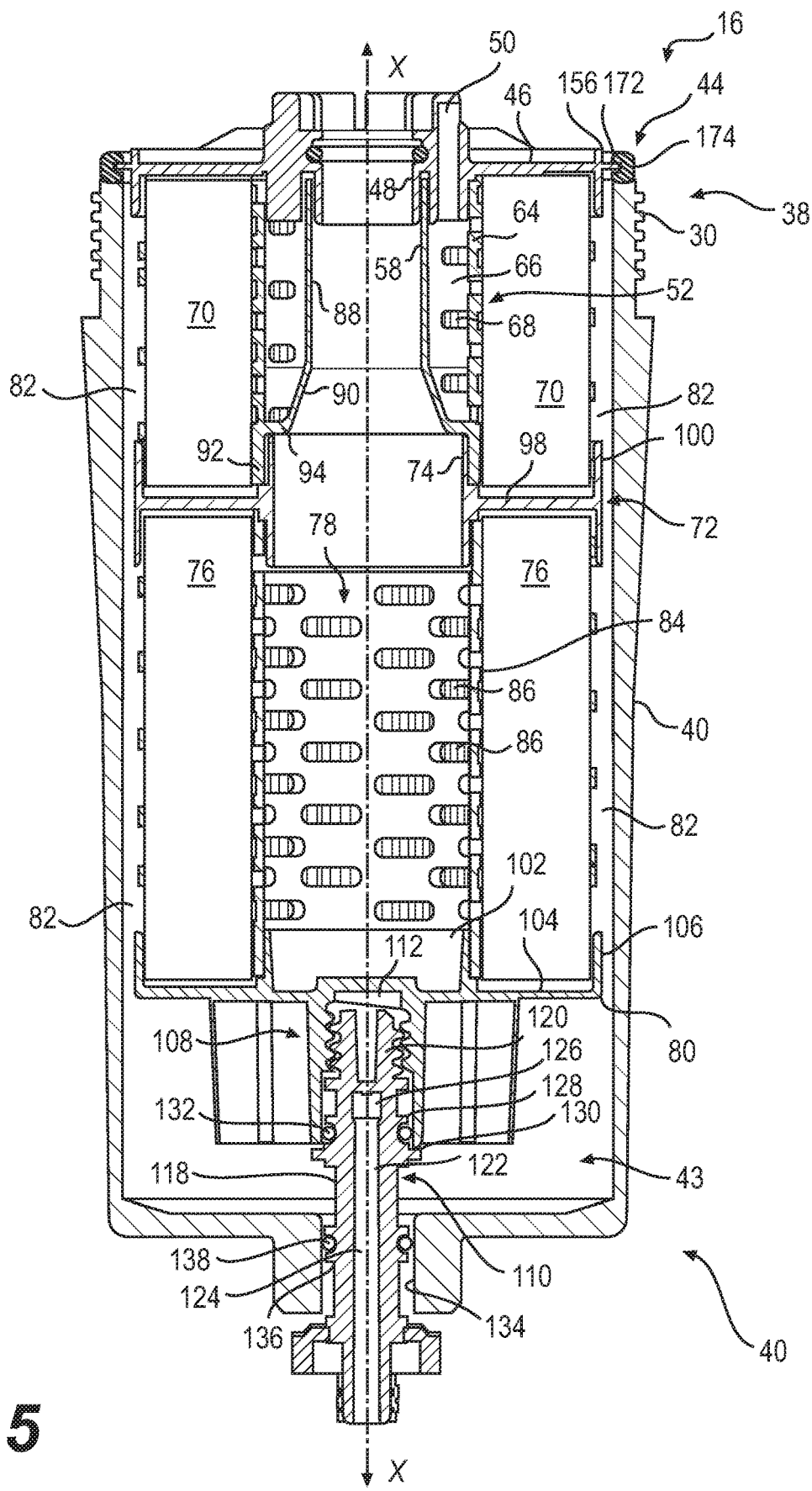
FIG. 5 is a side section view of an exemplary embodiment of a filter element and an exemplary embodiment of a canister.

As shown in FIGS. 4 and 5, exemplary second end cap 80 also includes a drain boss 108 configured to receive a drain plug 110 (see FIG. 5). Exemplary drain boss 108 extends in the opposite direction from second end cap barrier 104 as compared to end cap boss 102. As shown in FIGS. 4 and 5, exemplary drain boss 108 includes a pocket 112 configured to receive drain plug 110. Exemplary pocket 112 includes a threaded portion 114 and a smooth-walled pocket bore 116, with the threaded portion 114 being closest to second end cap barrier 104, and pocket bore 116 being remote from second end cap barrier 104.

Exemplary drain plug 110 shown in FIG. 5 includes a shank 118 having a threaded portion 120 configured to engage complimentary threaded portion 114 of pocket 112. Drain plug 110 also includes an internal passage 122 configured to selectively provide flow communication between collection bowl 43 and the exterior of collection bowl 43 when drain plug 110 is rotated (e.g., unscrewed) to a point at which internal passage 122 is exposed to fluid in collection bowl 43. Internal passage 122 includes a longitudinal portion 124 and a transverse portion 126 in flow communication with longitudinal portion 122. Exemplary drain plug 110 also includes a first seal groove 128 and a shoulder 130. Seal groove 128 receives a first seal member 132, such as an O-ring seal. First seal member 132 is configured to provide a fluid seal between shank 118 and pocket bore 116. Threaded portion 120 of drain plug 110 is located at a first end of shank 118 with transverse portion 126 of internal passage 122 being located between threaded portion 120 and first seal member 132.

As drain plug 110 is unscrewed from pocket 112, transverse portion 126 becomes exposed to fluid in collection bowl 43 as first seal member 132 emerges from pocket bore 116. Fluid flows via transverse portion 126 into longitudinal portion 124 and drains from drain plug 110 via longitudinal portion 124, thereby facilitating removal of fluid collected in collection bowl 43 from filter assembly 10. For example, if the collected fluid is water that has been separated from fuel by first filter media 70 and/or second filter media 76, the water may be drained in this exemplary manner.

As shown in FIG. 5, second end 40 of canister 14 includes a drain plug bore 134 configured to receive shank 118 of drain plug 110. Exemplary shank 118 of drain plug 110 includes a second seal groove 136, which receives a second seal member 138, for example, an O-ring seal. Second seal member 138 is configured to provide a fluid seal with drain plug bore 134, thereby preventing unintentional passage of fluid out of collection bowl 43. For example, as drain plug 110 reciprocates with drain plug bore 134 via rotation of drain plug 110, second seal member 138 maintains a fluid seal with drain plug bore 134. According to this exemplary embodiment, tightening drain plug 110, such that threaded portion 120 of drain plug 110 moves deeper into pocket 112 is limited by shoulder 130 on shank 118 abutting the outer end of pocket 112, so that drain plug 110 is prevented from being driven too far into pocket 112. Drain plug 110 may be loosened far enough for first seal member 132 to emerge from pocket 112, thereby permitting fluid to drain from collection bowl 43, while second seal member 138 maintains a fluid seal with drain plug bore 134.

Figure 6:
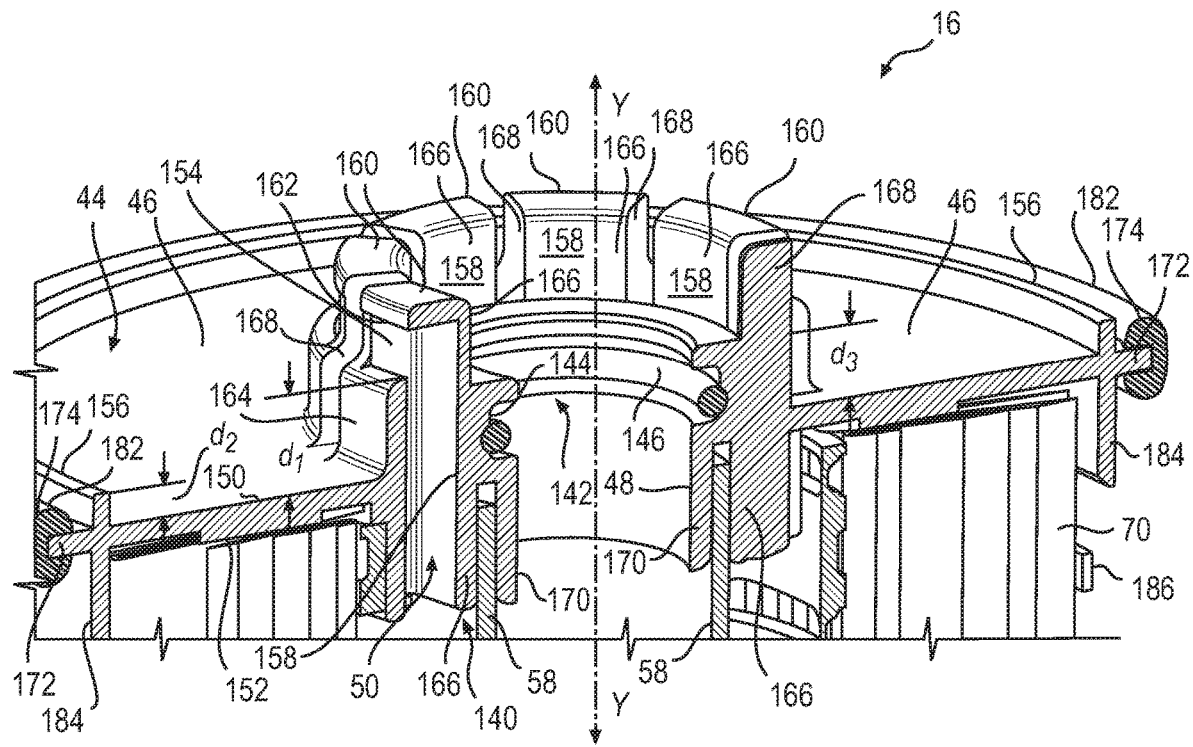
FIG. 6 is a partial perspective section view of an exemplary embodiment of a filter element including an exemplary embodiment of a first end cap.
Figure 7:
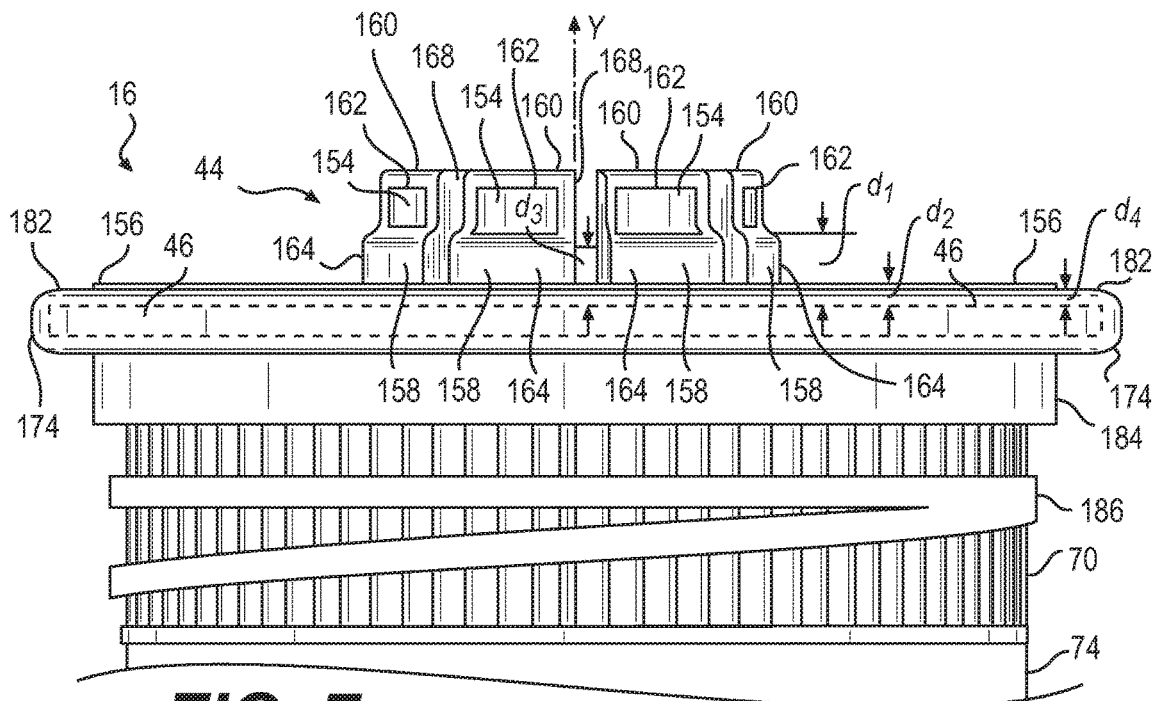
FIG. 7 is a partial side view of an exemplary embodiment of a filter element including an exemplary embodiment of a first end cap.

According to the exemplary embodiment shown in FIGS. 6 and 7, filter element 16 includes first end cap 44 configured to provide flow communication between the interior and exterior of filter element 16. In the exemplary embodiment shown, first end cap 44 includes an element receiver 140 having a longitudinal axis Y and being configured to be coupled to first tubular member 52. According to some embodiments, longitudinal axis Y is parallel to (e.g., co-linear with) longitudinal axis X of filter element 16. Exemplary first end cap 44 also includes a base passage receiver 142 defining end cap aperture 48 and including a seal groove 144 that receives a receiver seal 146 configured to provide a fluid seal between first passage 32 of filter base 12 and first end cap 44. According to some embodiments, receiver seal is an O-ring seal. Element receiver 140 and base passage receiver 142 are in flow communication with one another and permit fluid to flow into and out of filter element 16.

Figure 8:
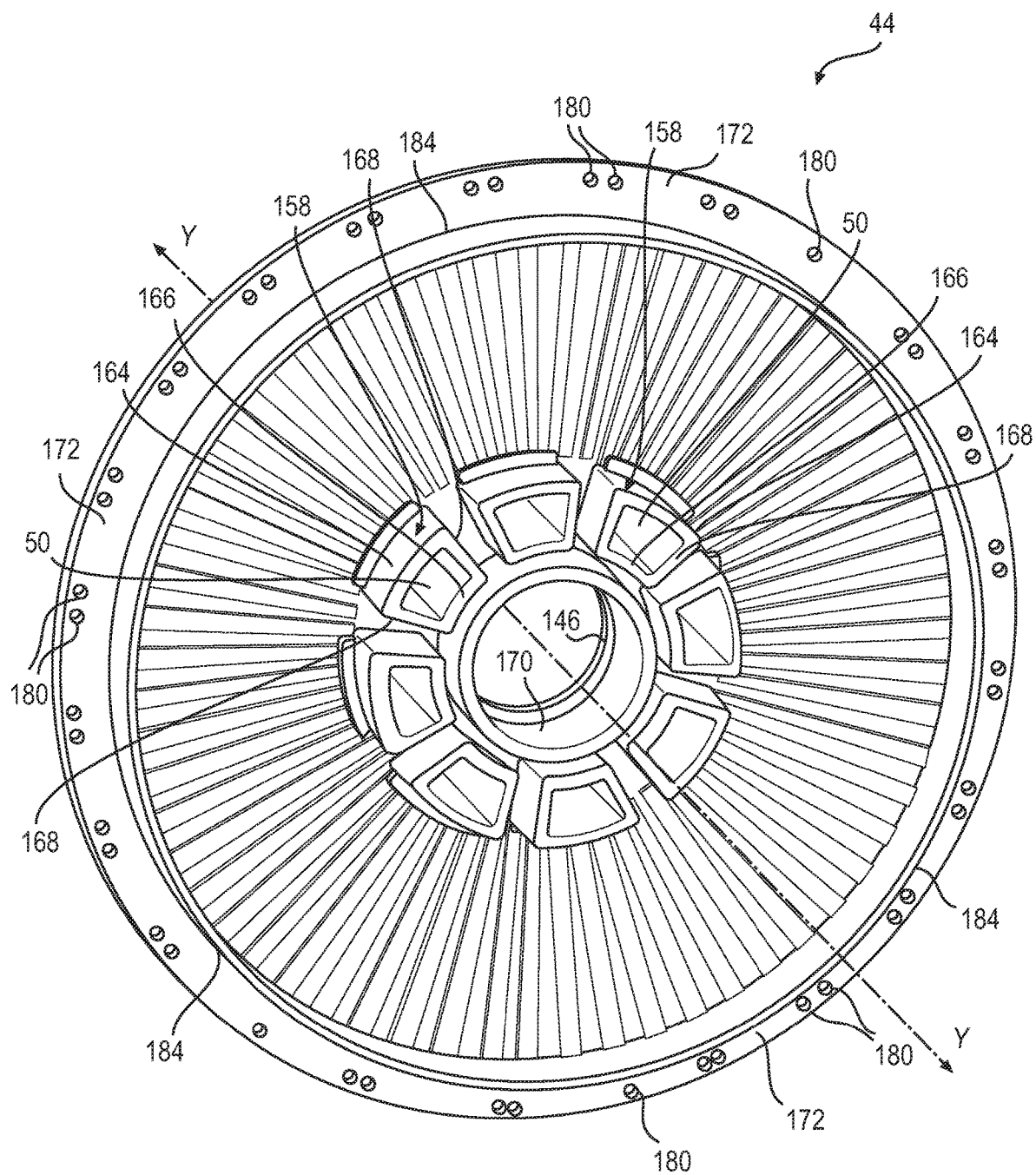
FIG. 8 is a bottom perspective view of an exemplary embodiment of a first end cap.

Exemplary first end cap 44 includes end cap barrier 46 extending outward (e.g., radially outward) from base passage receiver 142 in a direction transverse to longitudinal axis Y. According to some embodiments, end cap barrier 46 may be annular with a circular periphery, for example, as shown in FIGS. 6 and 8. End cap barrier 46 includes a first side 150 configured to face filter base 12 and a second side 152 configured to face first filter media 70 when assembled in filter assembly 10. According to some embodiments, end cap barrier 46 is substantially planar and is configured to force fluid flowing through filter element 16 to enter and exit filter element 16 through either end cap flow passages 50 or base passage receiver 142.

As shown in FIGS. 6 and 7, first end cap 44 also includes end cap flow passages 50 positioned around base passage receiver 142 and configured to provide flow communication between first filter media 70 and filter base 12. As shown, exemplary end cap flow passages 50 extend from second side 152 of end cap barrier 46 to first side 150 of end cap barrier 46 in a direction along longitudinal axis Y (e.g., in a direction parallel to longitudinal axis Y). Exemplary end cap flow passages 50 each include a passage opening 154 spaced a first distance $d_1$ from first side 150 of end cap barrier 46.

According to some embodiments, first end cap 44 includes a peripheral lip 156 extending from first side 150 of end cap barrier 46 in a direction transverse to (e.g., perpendicular to) end cap barrier 46 and terminating a second distance $d_2$ from first side 150 of end cap barrier 46. For example, end cap barrier 46 may be annular, and peripheral lip 156 may also be annular. Peripheral lip 156 may act to space end cap barrier 46 from an underside of filter base 12. According to some embodiments, first distance $d_1$ to passage openings 154 is greater than second distance $d_2$ to the end of peripheral lip 156. According to such embodiments, if filter element 16 is primed by pouring, for example, unfiltered fuel into first end cap aperture 48 and some of the poured fuel spills onto end cap barrier 46, the fuel is unlikely to flow into end cap flow passages 50 because passage openings 154 are farther away from end cap barrier 46 than the end of peripheral lip 156, thereby allowing fuel to flow over peripheral lip 156 instead of into end cap flow passages 50. This may be desirable for filter assemblies such as the exemplary embodiment shown in FIG. 1, where end cap flow passages 50 lead to the downstream (or "clean" side) of the filter assembly, where during normal operation, the fuel would have already been filtered. If fuel used to prime filter element 16 flows into the "clean" side, it will not be filtered before it enters the fuel system, which can lead to fuel with contaminants reaching the fuel system parts such as the injectors.

According to some embodiments, such as shown in FIGS. 6 and 7, base passage receiver 142 terminates at a third distance $d_3$ from first side 150 of end cap barrier 46, and first distance $d_1$ to passage openings 154 is greater than third distance $d_3$ to the end of base passage receiver 142. If filter element 16 is primed by pouring unfiltered fuel into first end cap aperture 48 and some of the poured fuel spills onto end cap barrier 46, the fuel is unlikely to flow into end cap flow passages 50 because passage openings 154 are farther away from end cap barrier 46 than the end of base passage receiver 142, thereby allowing fuel to flow into base passage receiver 142 instead of into end cap flow passages 50. As noted above, this may be desirable to prevent unfiltered fuel from entering end cap flow passages 50 and the "clean" side of the filter assembly.

According to the exemplary embodiment shown, each of end cap flow passages 50 is defined by a tubular passage conduit 158 extending from first side 150 of end cap barrier 46, and passage openings 154 face outward and transverse relative to longitudinal axis Y. For example, as shown in FIGS. 6 and 7, exemplary tubular passage conduits 158 are circumferentially spaced around base passage receiver 142. Passage openings 154 face radially outward away from longitudinal axis Y. This exemplary configuration helps to prevent splashing of unfiltered fuel into passage openings 154 and the "clean" side of filter element 16. According to some embodiments, this also permits fluid to flow into base passage receiver 142 from end cap barrier 46 if fluid is spilled on end cap barrier 46.

According to some embodiments, passage openings 154 face transverse to longitudinal axis Y. For example, tubular passage conduits 158 include an end barrier 160 extending transverse to longitudinal axis Y and define an end 162 of passage openings 154 remote from end cap barrier 46. For example, as shown in FIGS. 6 and 7, exemplary tubular passage conduits 158 include a front wall 164 extending transversely from (e.g., perpendicularly from) end cap barrier 46 and terminating at a lower edge of passage openings 154. Tubular passage conduits 158 also include a rear wall 166 extending transversely from (e.g., perpendicularly from) end cap barrier 46 and terminating at end barrier 160, which defines an upper front edge of passage openings 154. Exemplary tubular passage conduits 158 also include opposing side walls 168 extending transversely from (e.g., perpendicularly from) end cap barrier 46 and terminating at end barrier 160. Side walls 168 define opposing side edges of passage openings 154. Exemplary end barrier 160 is configured to help prevent unintentional pouring of unfiltered fuel into passage openings 154 and into the "clean" side of filter element 16.

As shown in FIGS. 6 and 8, exemplary tubular passage conduits 158 of first end cap 44 also extend from second side 152 of end cap barrier 46. For example, exemplary element receiver 140, which is configured to receive an end of inner tubular element 58 of first tubular member 52, includes an inner wall 170. Rear walls 166 of tubular passage conduits 158 are spaced from inner wall 170 and create a recess (e.g., an annular recess) in which inner tubular element 58 is received, with inner tubular element 58 fitting around inner wall 170. Outer tubular element 64 of first tubular member 52 fits around front walls 164 of tubular passage conduits 158. In this exemplary manner, first end cap 44 and first tubular member 52 may be coupled to one another. According to some embodiments, adhesive and/or sealant may be used to maintain the coupling between first end cap 44 and first tubular member 52 and provide a fluid seal therebetween. The use of adhesives and/or sealants known to those skilled in the art is contemplated.

As shown in FIGS. 6-8, exemplary first end cap 44 also includes a barrier edge 172 associated with end cap barrier 46 and a peripheral seal 174 coupled to barrier edge 172. Exemplary peripheral seal 174 is configured to provide a fluid seal with at least one of filter base 12 and canister 14 of filter assembly 10, upon assembly. For example, as shown in FIG. 2, peripheral seal 174, upon assembly of canister 14 to filter base 12 with filter element 16 inserted in canister 14, is received in a shoulder 176 of filter base 12 and is sandwiched between an open end edge 178 of canister 14 when canister 14 is coupled to filter base 12, for example, via threaded engagement. This exemplary configuration creates a fluid tight seal between filter base 12, canister 14, and filter element 16 (via first end cap 44).

As shown in FIGS. 6-8, exemplary barrier edge 172 may take the form of an extension of a peripheral edge of end cap barrier 46. According to the exemplary embodiment shown in FIG. 8, barrier edge 172 includes a plurality of holes 180. For example, FIG. 8 shows first end cap 44 without peripheral seal 174. Holes 180 may provide a more secure coupling between barrier edge 172 and peripheral seal 174. For example, peripheral seal 174 may be molded onto barrier edge 172, such that molding material forming peripheral seal 174 flows into holes 180, and once the molding material cools and hardens to its final resilient form, the portions of molding material passing through holes 180 improve the security of the coupling between barrier edge 172 and peripheral seal 174. Other seal configurations and arrangements are contemplated.

According to some embodiments, an uppermost surface 182 of peripheral seal 174 may terminate a fourth distance $d_4$ from first side 150 of end cap barrier 46, wherein first distance $d_1$ to passage openings 154 is greater than fourth distance $d_4$ to uppermost surface of peripheral seal 174. This exemplary configuration may be desirable to prevent unfiltered fuel from entering end cap flow passages 50 and the "clean" side of the filter assembly if unfiltered fuel is spilled on end cap barrier 46 because it allows the fuel to flow over peripheral seal 174 instead of into passage openings 154.

According to some embodiments, first end cap 44 also includes a locator flange 184 extending from second side 152 of end cap barrier 46. As shown in, for example, FIG. 2, exemplary locator flange 184 is configured to fit around an upper end of first filter media 70 and inside first end 38 of canister 14 of filter assembly 10. This may serve to assist with proper alignment of filter element 16 with canister 14 and/or first end cap 44 with first filter media 70.

According to some embodiments, such as shown, element receiver 140, base passage receiver 142, seal groove 144, receiver seal 146, end cap barrier 46, peripheral lip 156, inner wall 170, barrier edge 172, peripheral seal 174, shoulder 176 of filter base 12, open end edge 178 of canister 14, and locator flange 184 are annular, circular, and/or have circular cross-sections. Other shapes and cross-sectional configurations are contemplated.

Figure 9:
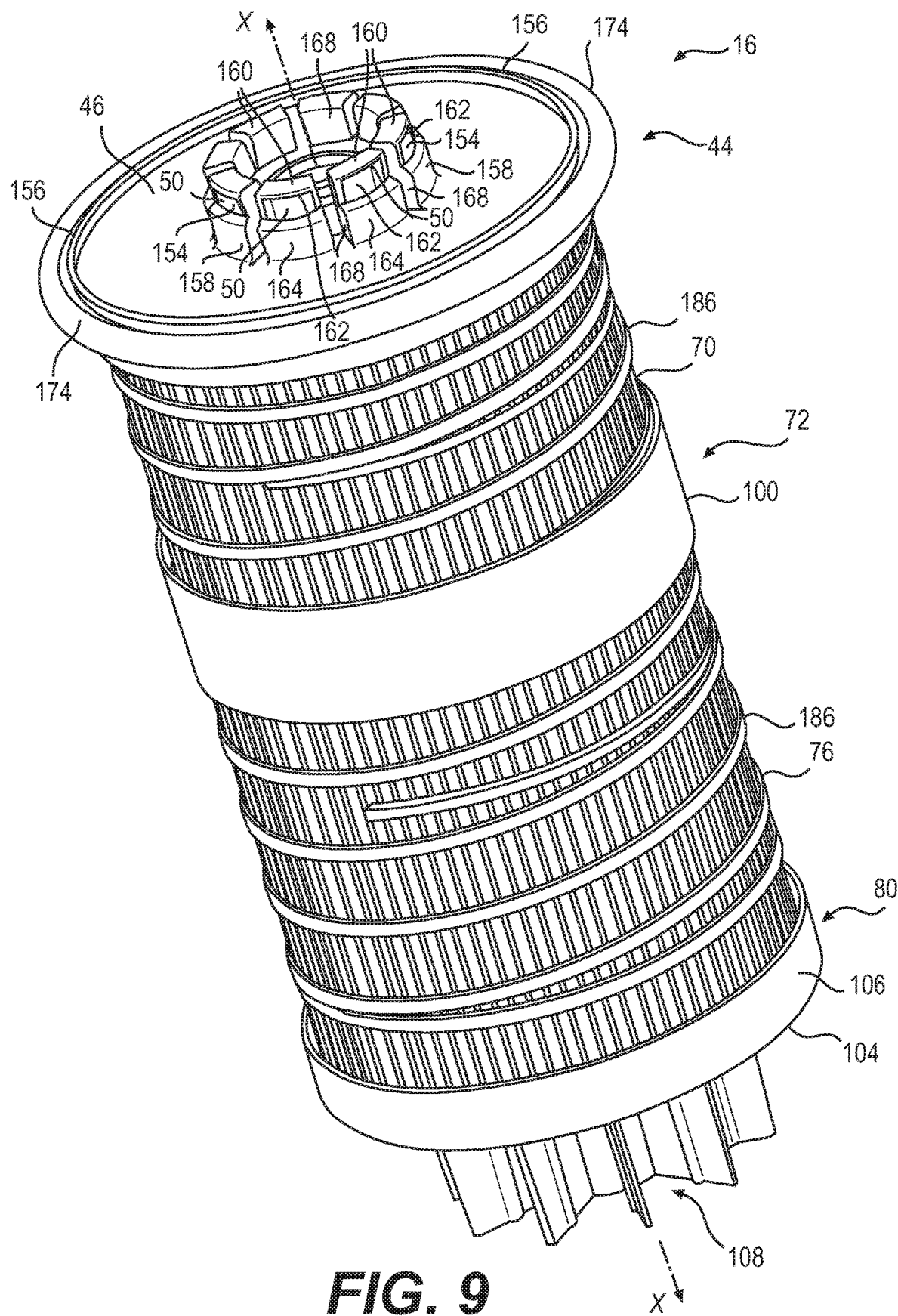
FIG. 9 is a perspective view of an exemplary embodiment of a filter element including an exemplary embodiment of a first end cap.

As shown in FIG. 9, first filter media 70 and/or second filter media 76 may be secured to filter element 16 via one or more rovings 186 (e.g., spirally-wrapped rovings). Although the exemplary embodiment shown in FIG. 9 includes spirally-wound rovings 186, alternative ways to couple first filter media 70 and/or second filter media 76 to filter element 16 are contemplated.

Figure 10:
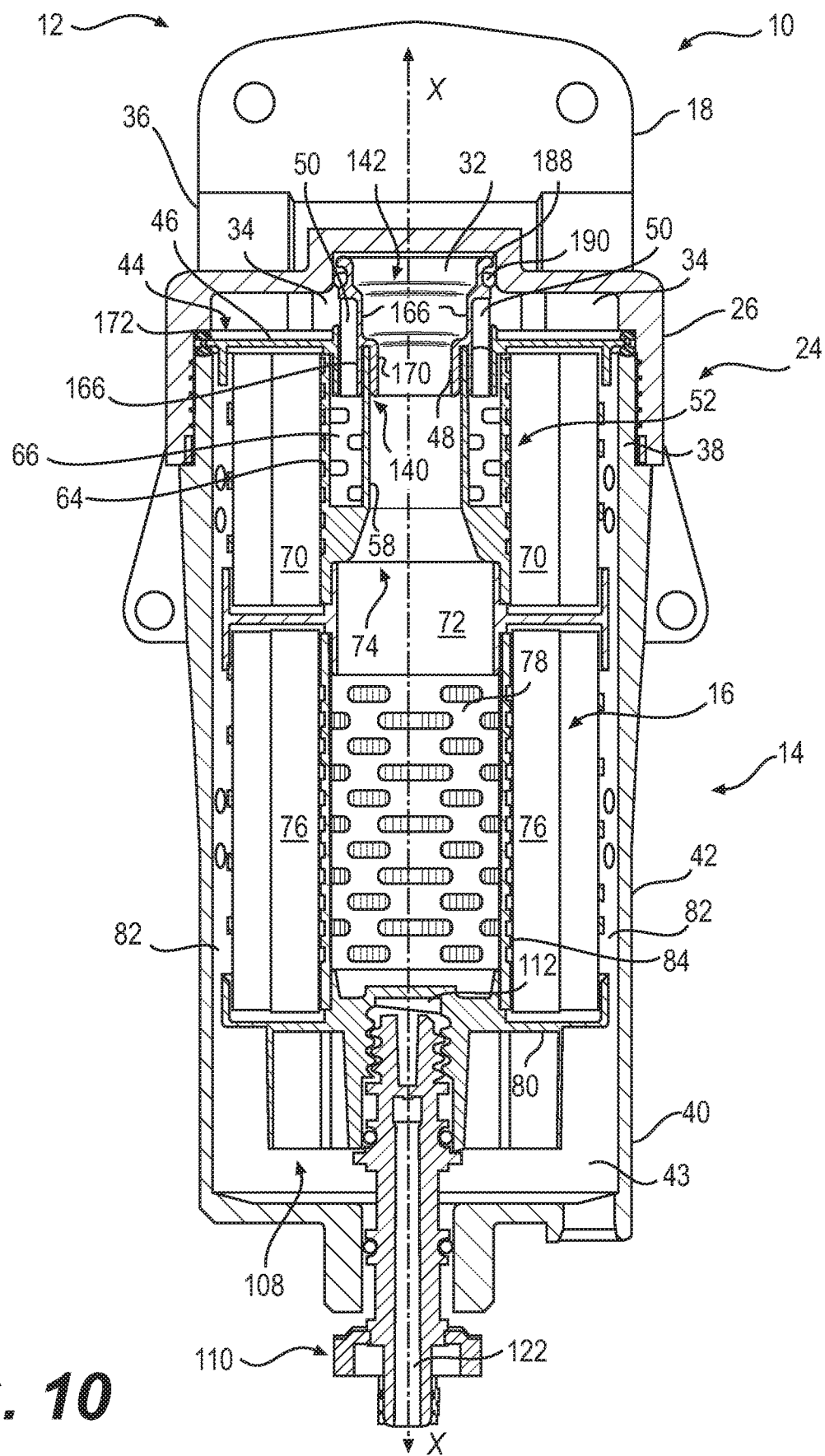
FIG. 10 is a side section view of an exemplary embodiment of a filter assembly.
Figure 11:
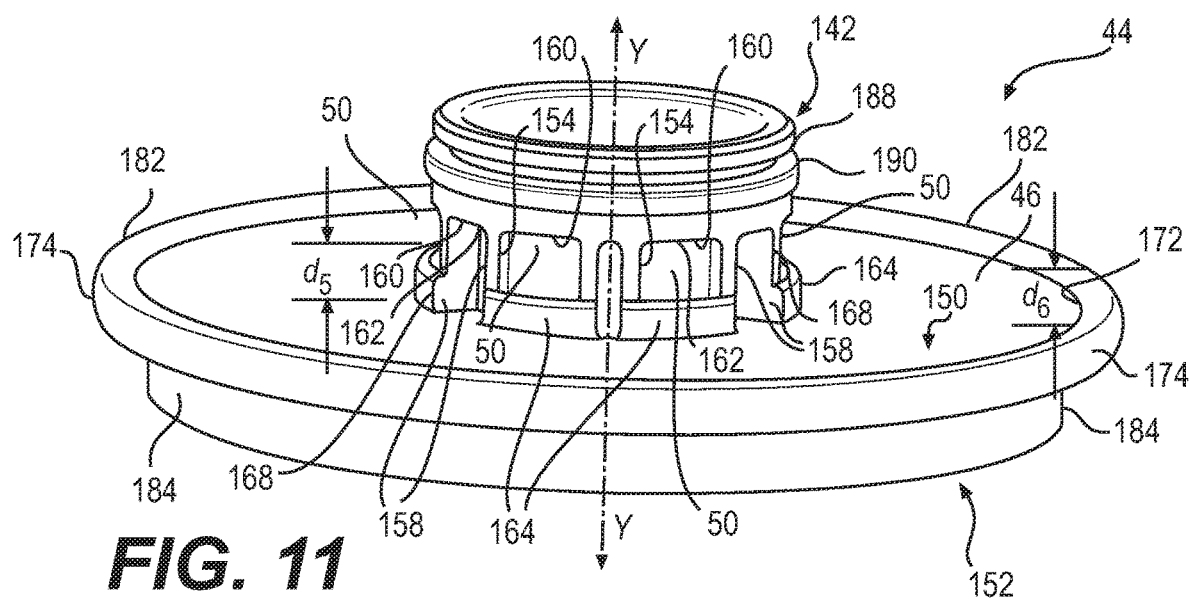
FIG. 11 is a perspective view of an exemplary embodiment of a first end cap.
Figure 12:
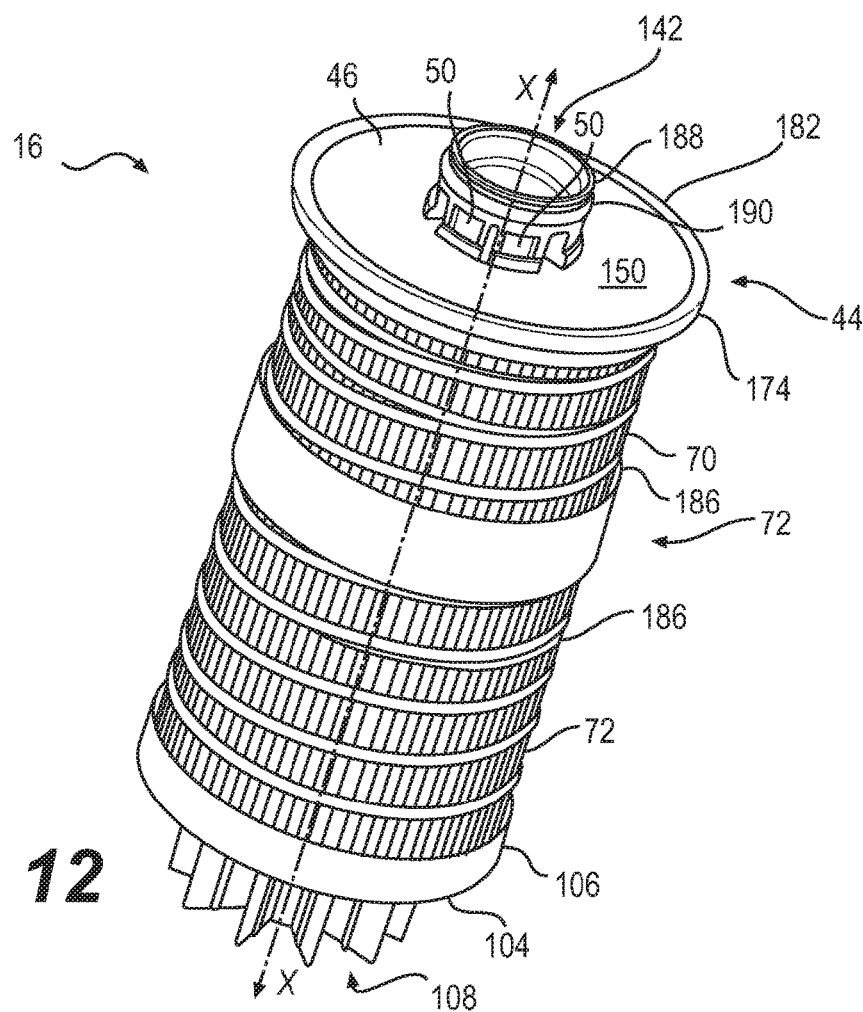
FIG. 12 is a perspective view of an exemplary embodiment of a filter element including an exemplary embodiment of a first end cap.

The exemplary embodiment of filter assembly 10 shown in FIGS. 10 and 12 is similar to the exemplary embodiment of filter assembly 10 shown in FIG. 1, except that it includes the alternative exemplary embodiment of first end cap 44 shown in FIGS. 10-12. Exemplary first end cap 44 shown in FIGS. 10-12 may also be used with exemplary filter assembly 10 shown in FIG. 3.

As shown in FIGS. 10-12, filter element 16 includes exemplary first end cap 44 configured to provide flow communication between the interior and exterior of filter element 16. In the exemplary embodiment shown, first end cap 44 includes an element receiver 140 having a longitudinal axis Y and being configured to be coupled to first tubular member 52. According to some embodiments, longitudinal axis Y is parallel to (e.g., co-linear with) longitudinal axis X of filter element 16. Exemplary first end cap 44 also includes a base passage receiver 142 defining end cap aperture 48 and including a seal groove 188 on a radially exterior surface of base passage receiver 142 that receives a seal 190 configured to provide a fluid seal between first passage 32 of filter base 12 and first end cap 44. According to some embodiments, seal 190 is an O-ring seal. Element receiver 140 and base passage receiver 142 are in flow communication with one another and permit fluid to flow into and out of filter element 16.

Exemplary first end cap 44 shown in FIGS. 10-12 includes end cap barrier 46 extending outward (e.g., radially outward) from base passage receiver 142 in a direction transverse to longitudinal axis Y. According to some embodiments, end cap barrier 46 may be annular with a circular periphery, for example, as shown in FIGS. 11 and 12. End cap barrier 46 includes a first side 150 configured to face filter base 12 and a second side 152 configured to face first filter media 70 when assembled in filter assembly 10. According to some embodiments, end cap barrier 46 is substantially planar and is configured to force fluid flowing through filter element 16 to enter and exit filter element 16 through either end cap flow passages 50 or base passage receiver 142.

As shown in FIGS. 10-12, exemplary first end cap 44 also includes end cap flow passages 50 positioned around base passage receiver 142 and configured to provide flow communication between first filter media 70 and filter base 12. Exemplary end cap flow passages 50 extend from second side 152 of end cap barrier 46 to first side 150 of end cap barrier 46 in a direction along longitudinal axis Y (e.g., in a direction parallel to longitudinal axis Y). Exemplary end cap flow passages 50 each include a passage opening 154 spaced a fifth distance $d_5$ from first side 150 of end cap barrier 46.

In contrast to the exemplary embodiment shown in FIGS. 6, 7, and 9, exemplary first end cap 44 shown in FIGS. 10-12 does not include a peripheral lip extending from first side 150 of end cap barrier 46. According to the exemplary embodiment shown in FIGS. 10-12, each of end cap flow passages 50 is defined by a tubular passage conduit 158 extending from first side 150 of end cap barrier 46, and passage openings 154 face outward and transverse relative to longitudinal axis Y. For example, as shown in FIGS. 11 and 12, exemplary tubular passage conduits 158 are circumferentially spaced around base passage receiver 142. Passage openings 154 face radially outward away from longitudinal axis Y. This exemplary configuration helps to prevent splashing of unfiltered fuel into passage openings 154 and the "clean" side of filter element 16. According to some embodiments, this also permits fluid to flow into base passage receiver 142 from end cap barrier 46 if fluid is spilled on end cap barrier 46.

According to some embodiments, passage openings 154 face transverse to longitudinal axis Y. For example, tubular passage conduits 158 include an end barrier 160 extending transverse to longitudinal axis Y and define an end 162 of passage openings 154 remote from end cap barrier 46. For example, as shown in FIGS. 11 and 12, exemplary tubular passage conduits 158 include a front wall 164 extending transversely from (e.g., perpendicularly from) end cap barrier 46 and terminating at a lower edge of passage openings 154. Tubular passage conduits 158 also include a rear wall 166 (see, e.g., FIG. 10) extending transversely from (e.g., perpendicularly from) end cap barrier 46 and terminating at end barrier 160, which defines an upper front edge of passage openings 154. Exemplary tubular passage conduits 158 also include opposing side walls 168 extending transversely from (e.g., perpendicularly from) end cap barrier 46 and terminating at end barrier 160. Side walls 168 define opposing side edges of passage openings 154. Exemplary end barrier 160 is configured to help prevent unintentional pouring of unfiltered fuel into passage openings 154 and into the "clean" side of filter element 16.

Exemplary tubular passage conduits 158 of first end cap 44 shown in FIGS. 10-12 also extend from second side 152 of end cap barrier 46 (see, e.g., FIG. 8). For example, exemplary element receiver 140, which is configured to receive an end of inner tubular element 58 of first tubular member 52, includes an inner wall 170. Rear walls 166 of tubular passage conduits 158 are spaced from inner wall 170 and create a recess (e.g., an annular recess) in which inner tubular element 58 is received, with inner tubular element 58 fitting around inner wall 170 (see, e.g., FIG. 10). Outer tubular element 64 of first tubular member 52 fits around front walls 164 of tubular passage conduits 158. In this exemplary manner, first end cap 44 and first tubular member 52 may be coupled to one another. According to some embodiments, adhesive and/or sealant may be used to maintain the coupling between first end cap 44 and first tubular member 52 and provide a fluid seal therebetween. The use of adhesives and/or sealants known to those skilled in the art is contemplated.

As shown in FIGS. 10-12, exemplary first end cap 44 also includes a barrier edge 172 associated with end cap barrier 46 and a peripheral seal 174 coupled to barrier edge 172. Exemplary peripheral seal 174 is configured to provide a fluid seal with at least one of filter base 12 and canister 14 of filter assembly 10, upon assembly. For example, as shown in FIG. 10 (see also FIG. 2), peripheral seal 174, upon assembly of canister 14 to filter base 12 with filter element 16 inserted in canister 14, is received in a shoulder 176 of filter base 12 and is sandwiched between an open end edge 178 of canister 14 when canister 14 is coupled to filter base 12, for example, via threaded engagement. This exemplary configuration creates a fluid tight seal between filter base 12, canister 14, and filter element 16 (via first end cap 44).

As shown in FIGS. 10-12, exemplary barrier edge 172 may take the form of an extension of a peripheral edge of end cap barrier 46. According to some embodiments, exemplary barrier edge 172 includes a plurality of holes, for example, holes 180 as shown in FIG. 8. Such holes may provide a more secure coupling between barrier edge 172 and peripheral seal 174. For example, peripheral seal 174 may be molded onto barrier edge 172, such that molding material forming peripheral seal 174 flows into the holes, and once the molding material cools and hardens to its final resilient form, the portions of molding material passing through the holes improve the security of the coupling between barrier edge 172 and peripheral seal 174. Other seal configurations and arrangements are contemplated.

According to some embodiments, an uppermost surface 182 of peripheral seal 174 may terminate a sixth distance $d_6$ from first side 150 of end cap barrier 46, wherein fifth distance $d_5$ to passage openings 154 is greater than sixth distance $d_6$ to uppermost surface of peripheral seal 174. This exemplary configuration may be desirable to prevent unfiltered fuel from entering end cap flow passages 50 and the "clean" side of the filter assembly if unfiltered fuel is spilled on end cap barrier 46 because it allows the fuel to flow over peripheral seal 174 instead of into passage openings 154.

According to the embodiment shown in FIGS. 10-12, first end cap 44 also includes a locator flange 184 extending from second side 152 of end cap barrier 46. As shown in, for example, FIG. 10, exemplary locator flange 184 is configured to fit around an upper end of first filter media 70 and inside first end 38 of canister 14 of filter assembly 10. This may serve to assist with proper alignment of filter element 16 with canister 14 and/or first end cap 44 with first filter media 70.

According to some embodiments, such as shown, element receiver 140, base passage receiver 142, seal groove 144, receiver seal 146, end cap barrier 46, inner wall 170, barrier edge 172, peripheral seal 174, shoulder 176 of filter base 12, open end edge 178 of canister 14, and locator flange 184 are annular, circular, and/or have circular cross-sections. Other shapes and cross-sectional configurations are contemplated. As shown in FIG. 12, first filter media 70 and/or second filter media 76 may be secured to filter element 16 via one or more rovings 186 (e.g., spirally-wrapped rovings). Although the exemplary embodiment shown in FIG. 12 includes spirally-wound rovings 186, alternative ways to couple first filter media 70 and/or second filter media 76 to filter element 16 are contemplated.

INDUSTRIAL APPLICABILITY

The exemplary end caps, filter elements, and filter assemblies of the present disclosure may be applicable to a variety of fluid systems. For example, the end caps, filter elements, and filter assemblies may be applicable to power systems, such as, for example, compression-ignition engines, gasoline engines, gaseous-fuel powered engines, and other internal combustion engines known in the art. For example, the end caps, filter elements, and filter assemblies may be used in a fuel system, for example, to separate water from fuel and/or remove particulate matter from fuel prior to being supplied to an engine. Use of the disclosed end caps, filter elements, and filter assemblies may result in a more desirable level of filtration and/or separation of water from fuel, even in circumstances where water may be particularly difficult to separate from fuel.

According to some embodiments, filter element 16 and filter assembly 10 may provide improved separation by virtue of, for example, the combination of filter media types and/or the flow paths of the fluid through filter element 16 and filter assembly 10. For example, the combination of the coalescing-type media and barrier-type media may improve the effectiveness of the separation of fluids from one another, such as the separation of water from fuel. Once the water has coalesced into droplets following passage through the coalescing-type media, any larger droplets that are carried to the barrier-type media with the fuel are prevented from passing through the barrier-type media with the fuel, thereby causing the droplets to drop down into collection bowl 43. In addition, according to some embodiments, once the water is separated from the fuel, the water and fuel may flow in different directions in filter assembly 16, thereby possibly further improving the effectiveness of the separation. As a result, according to some embodiments, the filter elements and filter assemblies may improve the separation of water from fuel, for example, when water is emulsified in the fuel and/or when the fuel contains bio-components. According to some embodiments, the methods may serve a similar purpose.

In addition, according to some embodiments, first end cap 44 may reduce the likelihood that unfiltered fuel is accidentally added to the "clean" side of the filter assembly, for example, when the filter assembly is being primed before installation or reassembly in a machine. For example, end cap flow passages 50 may be configured to prevent such occurrences.

According to some embodiments, a first distance from end cap barrier 46 to passage openings 154 is greater than a second distance from end cap barrier 46 to the end of peripheral lip 156. In such a configuration, fuel is unlikely to flow into end cap flow passages 50 because passage openings 154 are farther away from end cap barrier 46 than the end of peripheral lip 156, thereby allowing fuel to flow over peripheral lip 156 instead of into end cap flow passages 50. According to some embodiments, the first distance from end cap barrier 46 to passage openings 154 is greater than a third distance to the end of base passage receiver 142. In such a configuration, fuel is unlikely to flow into end cap flow passages 50 because passage openings 154 are farther away from end cap barrier 46 than the end of base passage receiver 142, thereby allowing fuel to flow into base passage receiver 142 (i.e., the "dirty" side of the filter element in some embodiments) instead of into end cap flow passages 50. According to some embodiments, the first distance from end cap barrier 46 to passage openings 154 is greater than a fourth distance to an uppermost surface of peripheral seal 174. This exemplary configuration may result in fuel flowing over peripheral seal 174 instead of into passage openings 154 if fuel is spilled onto end cap barrier 46. These exemplary configurations may reduce the likelihood that unfiltered fuel is accidentally added to the "clean" side of the filter assembly.

It will be apparent to those skilled in the art that various modifications and variations can be made to the disclosed, exemplary filter elements, filter assemblies, and methods. Other embodiments will be apparent to those skilled in the art from consideration of the specification and practice of the disclosed examples. It is intended that the specification and examples be considered as exemplary only, with a true scope being indicated by the following claims and their equivalents.

What is claimed is:

1. An end cap for a filter element, the end cap comprising:
a central tubular member receiving boss including an annular recess having a longitudinal axis and the annular recess being configured to receive a tubular element of a tubular member to enable the central tubular member receiving boss to be coupled to a tubular member;

a central filter base passage receiving portion including an inner end cap aperture defined through a central portion of the central filter base passage receiving portion and providing flow communication between the central tubular member receiving boss and the central filter base passage receiving portion;

an end cap barrier wall extending outward from the central filter base passage receiving portion in a direction transverse to the longitudinal axis, the end cap barrier wall including a first side configured to face a filter base located on an exterior side of the filter element in a first direction when assembled in a filter assembly and a second side configured to face filter media located on an interior side of the filter element in a second direction opposite to the first direction when assembled in a filter assembly;

end cap flow passages defined through the end cap separate from the inner end cap aperture and located in spaced positions around the central filter base passage receiving portion and configured to provide flow communication between filter media and a filter base, the end cap flow passages extending between the second side of the end cap barrier wall and the first side of the end cap barrier wall in a direction along the longitudinal axis, wherein the end cap flow passages each include a passage opening spaced a first distance from the first side of the end cap barrier wall in the first direction perpendicular to the end cap barrier wall; and a barrier edge along an outer circumferential periphery of the end cap barrier wall and a peripheral seal coupled to the barrier edge and configured to provide a fluid seal with at least one of a filter base and a canister of a filter assembly, wherein an uppermost surface of the peripheral seal terminates a second distance from the first side of the end cap barrier wall in the first direction perpendicular to the end cap barrier wall, wherein the first distance is greater than the second distance, and wherein each of the end cap flow passages is defined by a tubular passage conduit extending from the first side of the end cap barrier wall, and wherein at least some of the tubular passage conduits are spaced from one another such that fluid is able to flow between the at least some of the tubular passage conduits and into the central filter base passage receiving portion.

2. The end cap of claim 1, further including a peripheral lip extending from the first side of the end cap barrier in a direction transverse to the end cap barrier and terminating a fourth distance from the first side of the end cap barrier, wherein the first distance is greater than the fourth distance.

3. The end cap of claim 1, wherein the barrier edge includes a plurality of holes, and portions of the peripheral seal extend through the holes.

4. An end cap for a filter element, the end cap comprising:
a central tubular member receiving boss including an annular recess having a longitudinal axis and the annular recess being configured to receive a tubular element of a tubular member to enable the central tubular member receiving boss to be coupled to a tubular member;

a central filter base passage receiving portion, the central tubular member receiving boss and the central filter base passage receiving portion being in flow communication with one another through an end cap aperture defined within the central filter base passage receiving portion;

an end cap barrier wall extending outward from the central filter base passage receiving portion in a direction transverse to the longitudinal axis, the end cap barrier wall including a first side configured to face a filter base located on an exterior side of the filter element in a first direction when assembled in a filter assembly and a second side configured to face filter media located on an interior side of the filter element in a second direction opposite from the first direction when assembled in a filter assembly;

end cap flow passages defined through the end cap separate from the end cap aperture and located in spaced positions around the central filter base passage receiving portion and configured to provide flow communication between filter media and a filter base, the end cap flow passages extending between the second side of the end cap barrier wall and the first side of the end cap barrier wall in a direction along the longitudinal axis, wherein the end cap flow passages each include a passage opening spaced a first distance from the first side of the end cap barrier wall in the first direction perpendicular to the end cap barrier wall; and a barrier edge along an outer circumferential periphery of the end cap barrier wall and a peripheral seal coupled to the barrier edge and configured to provide a fluid seal with at least one of a filter base and a canister of a filter assembly, wherein wherein the central filter base passage receiving portion terminates at a second distance from the first side of the end cap barrier wall in the first direction perpendicular to the end cap barrier wall, wherein the first distance is greater than the second distance, and wherein each of the end cap flow passages is defined by a tubular passage conduit extending from the first side of the end cap barrier wall in the first direction, and wherein at least some of the tubular passage conduits are spaced from one another such that fluid is able to flow between the at least some of the tubular passage conduits and into the central filter base passage receiving portion.

5. The end cap of claim 4, wherein the barrier edge includes a plurality of holes, and portions of the peripheral seal extend through the holes.

* * * * *